US012634390B2

(12) United States Patent (10) Patent No.: US 12,634,390 B2
Neuwirth et al. (45) Date of Patent: May 19, 2026

(54) GEO-SOCIAL MOBILE COMMUNICATION PLATFORM CONFIGURED TO A SMART BRACELET

(71) Applicant: BHJC, Hpllywood, FL (US)

(72) Inventors: Jonathan Neuwirth, Hollywood, FL (US); Gilad Savion, Miami, FL (US); Moshe Azulay, Sintra (PT)

(73) Assignee: BHJC, Hollywood, FL (US)

( * ) Notice: Subject to any disclaimer, the term of this patent is extended or adjusted under 35 U.S.C. 154(b) by 409 days.

(21) Appl. No.: 18/108,369

(22) Filed: Feb. 10, 2023

(65) Prior Publication Data

US 2023/0254398 A1 Aug. 10, 2023

Related U.S. Application Data

(60) Provisional application No. 63/308,870, filed on Feb. 10, 2022.

(51) Int. Cl.
| *H04M 1/72409* | (2021.01) |
| *H04B 1/3827* | (2015.01) |
| *H04W 4/02* | (2018.01) |

(52) U.S. Cl.
CPC ...... *H04M 1/724095* (2022.02); *H04B 1/385* (2013.01); *H04W 4/02* (2013.01); *H04B 2001/3861* (2013.01)

(58) Field of Classification Search
CPC ........ H04M 1/724095; H04M 1/72412; H04B 1/385; H04B 2001/3861; H04W 4/02; H04W 4/21; H04W 4/80
See application file for complete search history.

(56) References Cited

U.S. PATENT DOCUMENTS

| 2017/0076284 A1* | 3/2017 | Wu ........................ G06Q 20/40 |
| 2018/0000205 A1* | 1/2018 | Chinowsky ........... G06F 1/1694 |
| 2018/0225421 A1* | 8/2018 | Balasubramanian .. G06Q 50/01 |
| 2020/0233454 A1* | 7/2020 | Clark .................... H04L 51/224 |

FOREIGN PATENT DOCUMENTS

CN 109769235 A * 5/2019

* cited by examiner

*Primary Examiner* — Farid Seyedvosoghi
(74) *Attorney, Agent, or Firm* — Smith, Gambrell & Russell, LLP

(57) ABSTRACT

The present invention relates to a wearable smart device and system in the form of a smart bracelet configured to a geo-social mobile communication platform. This device combines self-expression of likes, interests, and social cues with a technological improvement over existing social networking through mobile devices. The smart bracelet contains a microcontroller, Bluetooth module, GPS module, one or more LED, and a battery. The device also includes user-selectable beads or "CODITTES" that attach to the bracelet and display various interests or social cues. The bracelet communicates with a mobile device through a front-end app and back-end app/database. The device facilitates physical social interactions by allowing users to share interests, social cues, and facilitate communication through near field communication. The present invention provides a novel solution to the challenge of in-person social interaction by combining self-expression and technology.

4 Claims, 12 Drawing Sheets

GEO-SOCIAL MOBILE COMMUNICATION PLATFORM CONFIGURED TO A SMART BRACELET

CROSS-REFERENCE TO RELATED APPLICATIONS

This application is a non-provisional of, and claims priority to, U.S. Provisional patent application No. 63/308,870, filed on Feb. 10, 2022, which is incorporated by reference as if fully set forth herein.

FIELD OF THE INVENTION

The present invention generally relates to a wearable smart device and related system and, more specifically, relates to a geo-social mobile communication platform configured to a smart bracelet.

BACKGROUND OF THE INVENTION

It is commonplace today to have interpersonal interactions through social media platforms. Dating, social, and business sites and platforms have provided a way for people to share interests and personal details. In-person social interaction, however, is still a challenge. Many people choose to express their interests or social positions through their clothing or jewelry. Ultimately, however, the in-person social interaction still requires a certain level of intuition-based action from the participants. There is currently no social network that interacts with physical objects in "the real world" in order to facilitate physical social interactions.

There exists, therefore, a need for an apparatus, method, and related system to overcome the above-stated shortcomings of the known art, such as the ability to combine self-expression of likes, interests, and other social cues, with a technological improvement over the known implementations of social networking through mobile devices.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the disclosure and specification and serve to further illustrate various embodiments and to explain various principles and advantages all in accordance with the present invention, in which.

Figure 1:
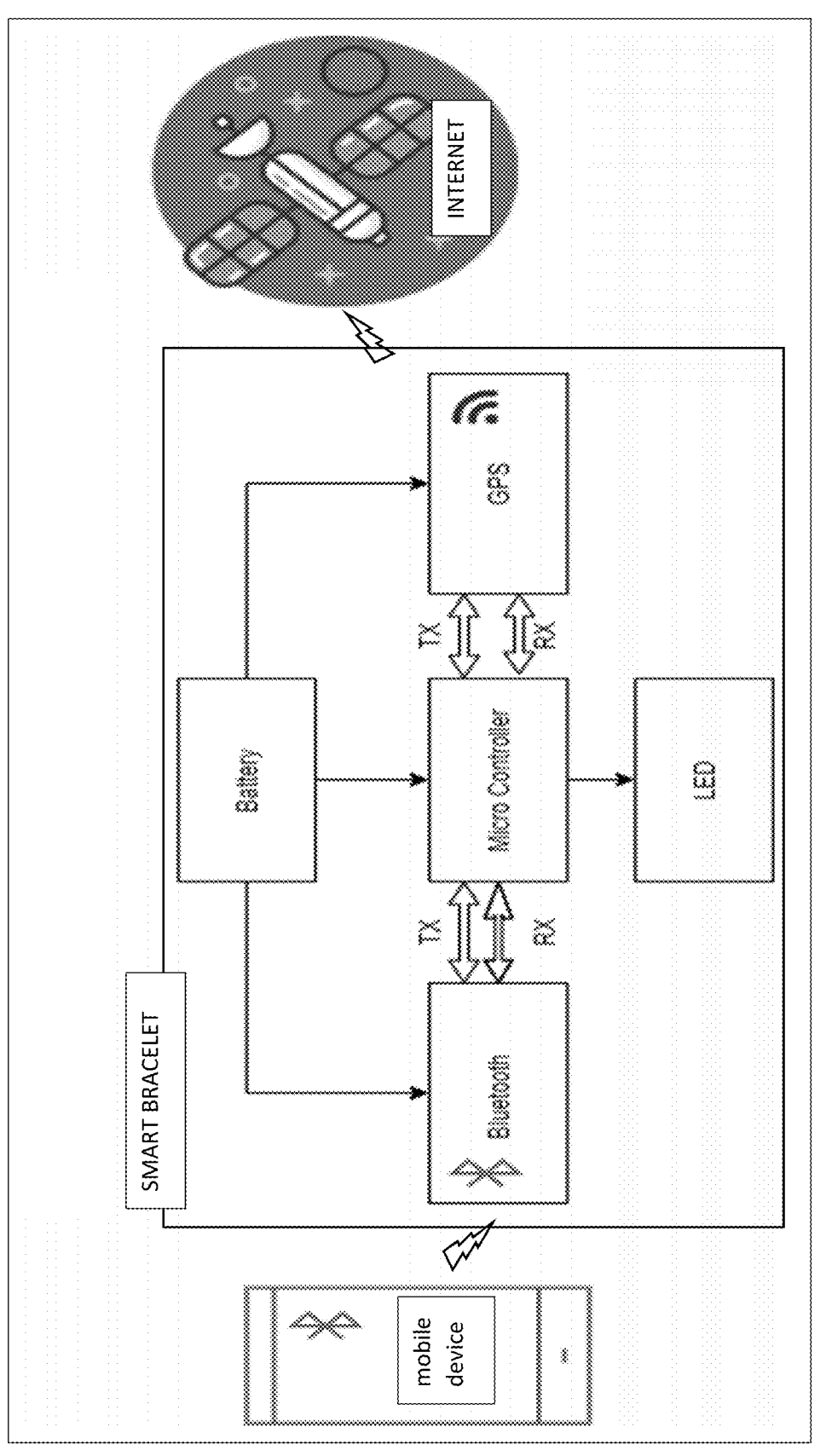
FIG. 1 is a simplified block diagram of the components of a smart bracelet system, according to an embodiment.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DESCRIPTION

Before describing in detail embodiments that are in accordance with the present invention, it should be observed that the some embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The accompanying figures, together with the description below are incorporated in and form part of the specification and serve to further illustrate various embodiments and to explain various principles and advantages all in accordance with the present invention.

While the invention as claimed can be modified into alternative forms, specific embodiments thereof are shown by way of example in the drawings and figures, and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

Throughout this disclosure, as well as, in the accompanying figures, certain words or phrases are used that represent novel features of the invention. For example, APHRODITTE, as used herein, means the overall system and components of the system related thereto. So, the APHRODITTE app, for example, refers to the specific implementation of a software application, or a computer program product, that runs at least a portion of the invention described herein. In a likewise manner, CODITTE, as used herein, means the physical apparatus that is attached to the smart bracelet and that further, by its shape, color, or configuration, indicates an index, or status, as utilized within, and in combination with, other components of the invention. CODITTES may also be interchangeably described herein as "beads" or "charms". Other terms, such as "mobile device," "Bluetooth," "NFC," and "GPS" have the meaning as is generally known in the art.

We disclose a wearable smart device such as, in a preferred embodiment, a smart bracelet in communication with a mobile device specially programmed with a front-end, or user-side, application and communicative with a back-end, or server-side, application and/or database. See FIG. 1. The smart bracelet of the preferred embodiment provides a critical user interaction point that is novel over the prior art. Specifically, the smart bracelet provides to the user the ability to combine self-expression of likes, interests, and other social cues, with a technological improvement over the known implementations of social networking through mobile devices. This improvement is described and referred to herein as beads, charms, or CODITTES.

Figure 2:
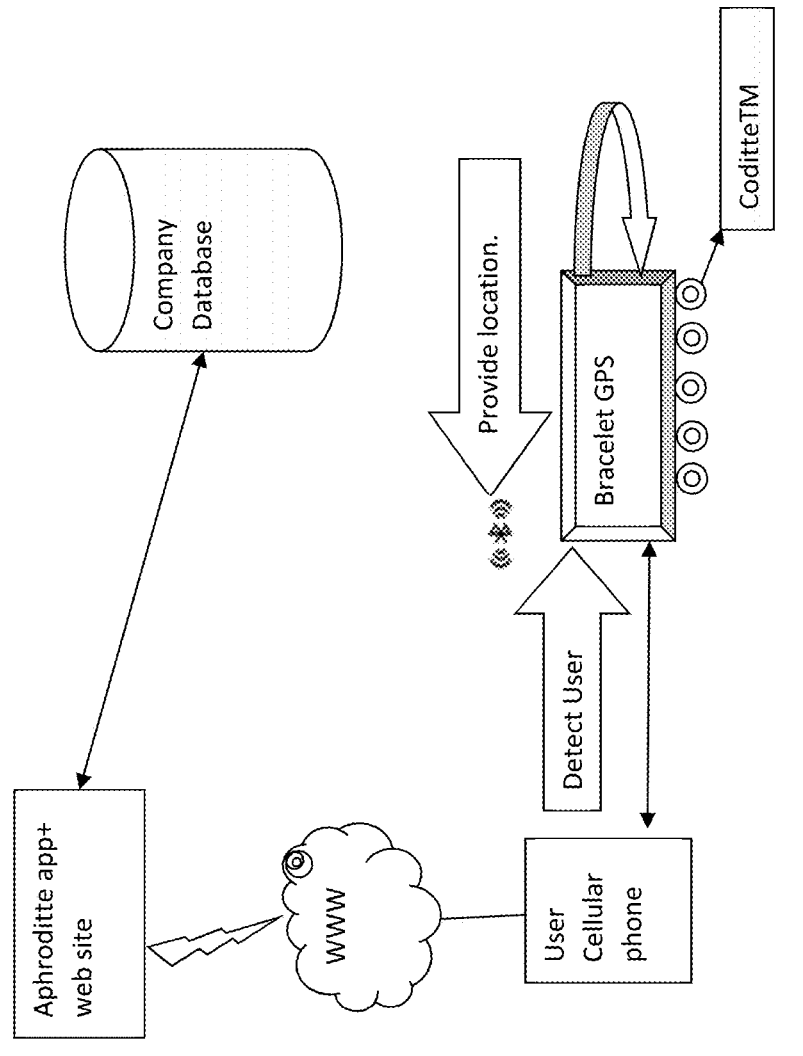
FIG. 2 shows the smart bracelet system sharing data via a wireless network connection, according to an embodiment.

In the preferred embodiment, a user purchases and wears the smart bracelet. The smart bracelet is comprised of a microcontroller, a Bluetooth module, a GPS module, a one or more LED, and a battery (FIG. 1). The smart bracelet is further configured to receive one or more user-selectable beads (CODITTES) that connect to the bracelet and transmit identification data to the bracelet, such as, but not limited to, bead type, name, style, and meaning (see, for example, FIG. 2). The smart bracelet can then transmit and receive information from and about the CODITTE to and from the mobile app via a paired mobile device.

The user specially programs their mobile device, such as a phone or tablet, with an executable program to be stored on and run by the mobile device as a front end application. The front end application is configured to access and utilize the subsystems of the mobile device, such as, but not limited to, the device's microprocessor, storage medium, wireless communication modules (cellular, wi-fi, Bluetooth, NFC, etc. . . . ), and GPS geo-location module. Through the application's user interface, a user can pair the smart bracelet with the application. This can be accomplished in a number of ways, but in the preferred embodiment this is accomplished via a Bluetooth connection. It is contemplated that such technological connections are known in the art, but as others are developed, it will also be able to be used to connect the smart bracelet with the mobile device. Once connected, the user can define a multitude of variables and personal information to be stored within the application. Additionally, the smart bracelet transmits data such as status, battery level, and the presence of any beads and corresponding bead data. This data is shared by the application via a wireless network connection to a backend server with a database (see FIGS. 2 and 3).

Additionally, the user, through the front-end application, is able to set parameters and status indicators to be transmitted back to the smart bracelet, to be received by the microprocessor where a pre-defined instruction set is carried out. For example, the user may choose to display a specific light setting to be displayed by on-bracelet or on-bead LEDs.

The present invention includes an online social network, hosted at a back-end server and accessible through a front-end application as disclosed above, in a bi-directional wireless data connection to the smart bracelet. The smart bracelet is further configured to accept one or more unique status elements (CODITTES, beads or charms) that are employed by the user and the system to create multiple levels of interpersonal connections throughout two dimensions (physical and network). This is achieved by the system utilizing the smart bracelet, the status identifiers from the unique status elements (CODITTES, beads or charms), as well as, the GPS location data and implementing those identifiers through transmission to the back-end server and database. In this way, users can show and represent personal preferences, check in at places, find friends in the vicinity, and conduct online and in-person social networking.

System

In a preferred embodiment, the inventive system comprises a smart device, such as a bracelet, configured to receive one or more CODITTE. The system further comprises, a mobile device that has been specially programmed via a mobile app that is configured to be in bi-directional communication with the smart bracelet. Additionally, a backend system, including a server and a database, is configured to be in bi-directional communication with the mobile device. The system, thereby, is adapted to combine the self-expression of likes, interests, and other social cues, with a technological improvement over the known implementations of social networking through mobile devices.

The SMART DEVICE Apparatus

A smart device, in embodiments in a bracelet form factor, sends the real-time GPS coordinates and changes the device characteristic (i.e., LED lights) based on data it receives from the mobile application via a Bluetooth channel.

A bracelet-sized device sends the real-time GPS coordinates and changes the device characteristic, i.e. LED lights based on data it receives from the mobile application via a Bluetooth channel. The required components are: a micro controller, a Bluetooth transmitter, a GPS receiver, LED lights, and a battery.

The communication between the mobile app and smart bracelet can be done in many ways, such as WiFi and Bluetooth. However, based on system requirements such as least power consumption and smallest size, Bluetooth communication is currently the choice for design implementation. The microcontroller and Bluetooth technology act as a bridge between the communication of the mobile app and the bracelet. On the other hand, GPS provides real-time coordinates to the micro controller, these coordinates are then transferred to the mobile app via Bluetooth connection.

Figure 3:
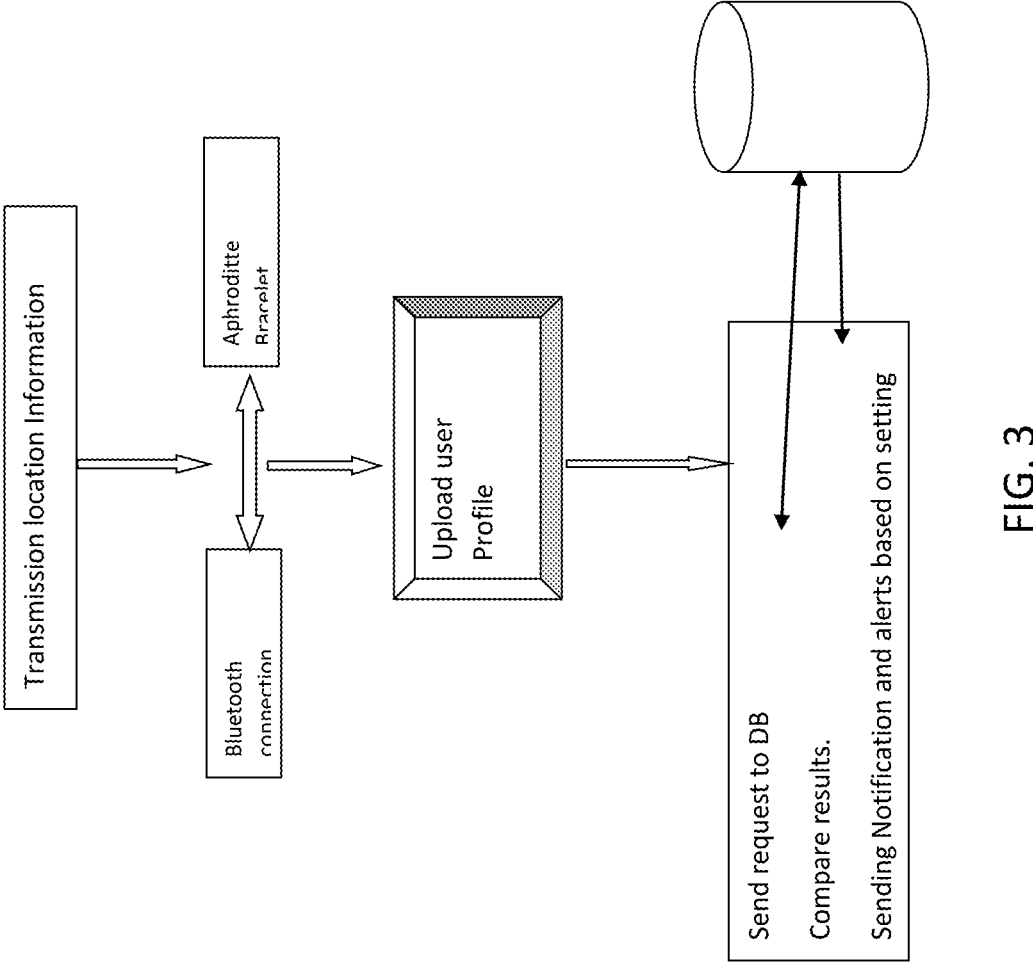
FIG. 3 shows a simplified flow diagram of information flow according to an embodiment.

As shown and FIG. 3 and described more fully here, the mobile device will communicate an ongoing GPS location data to the APHRODITTE application. The connection between the APHRODITE application and the smart bracelet is accomplished by using, preferably, a Bluetooth connection and a small hardware chip that is embedded in the bracelet or CODITTE. A user profile will be created and accessed via the APHRODITTE app.

Once the APHRODITTE app (through the mobile device) and the smart bracelet are paired:

(1) The bracelet receives nor/or, orders from the application backend server.

(2) The application queries its database (all data and user's data installed and saved)

(3) The application receives all data requests and answers and using the mobile device's Bluetooth connection to connect the bracelet.

(4) In some cases the application opens a session with the database backend server and sends notification alerts\ lamination of different colors to be displayed on the CODITTE.

(5) The mobile application can receive profiles or status orders.

Figure 4:
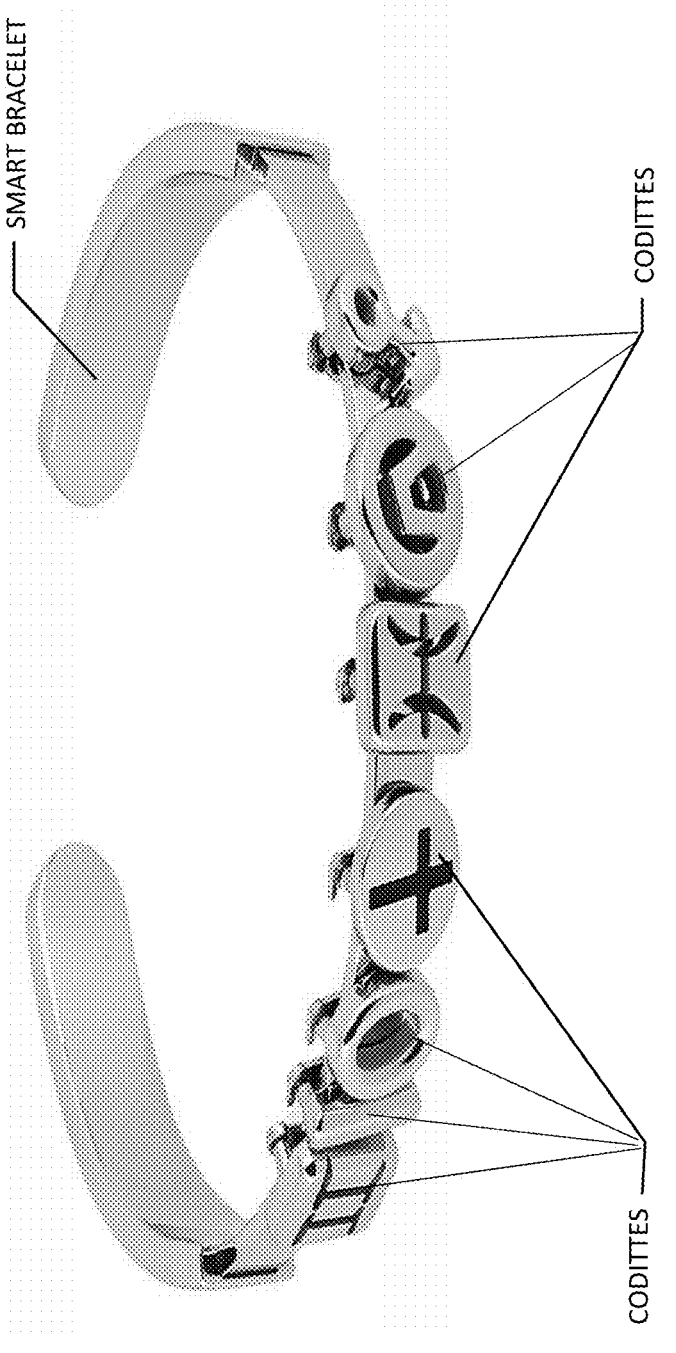
FIG. 4 shows an illustration of the smart bracelet with multiple varied CODITTES, according to an embodiment.
Figure 5:
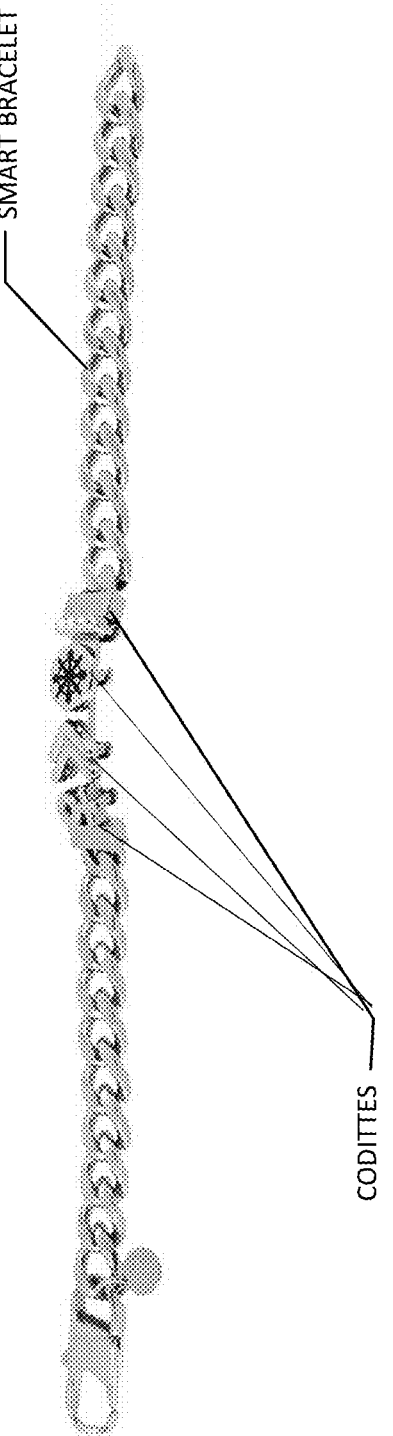
FIG. 5 shows another view of the smart bracelet, according to an embodiment.

FIGS. 4 and 5 show embodiments of smart bracelets with multiple varied CODITTES attached.

LED Light Integration

Figure 6:
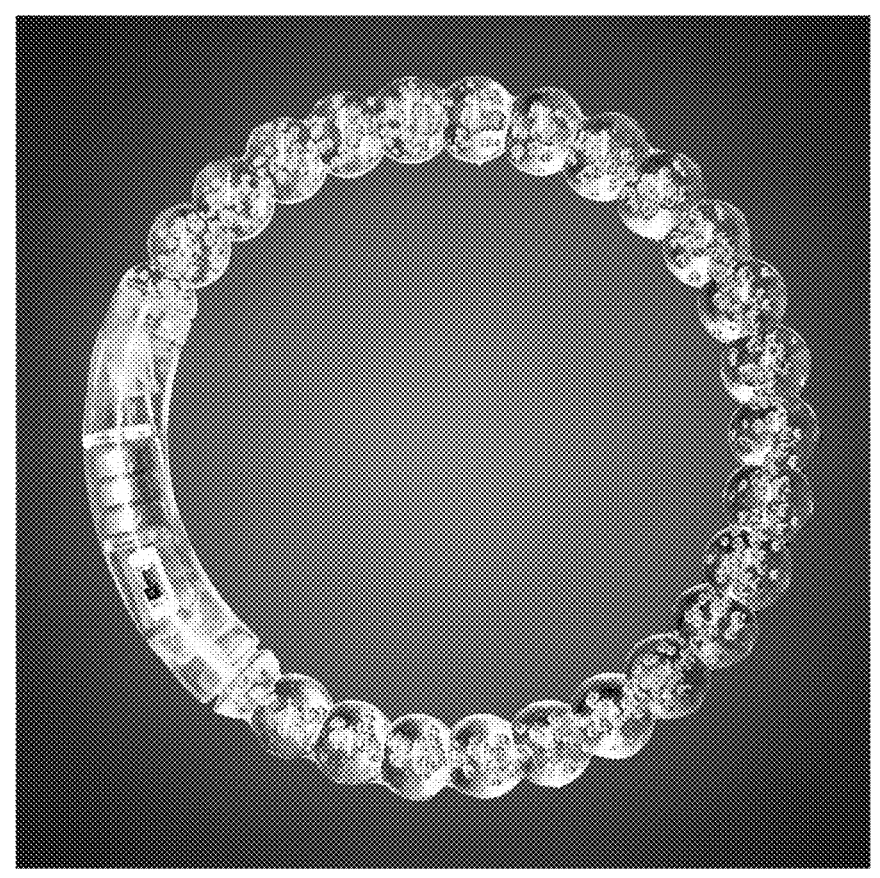
FIG. 6 shows the smart bracelet with LED light integration, according to an embodiment.
Figure 7:
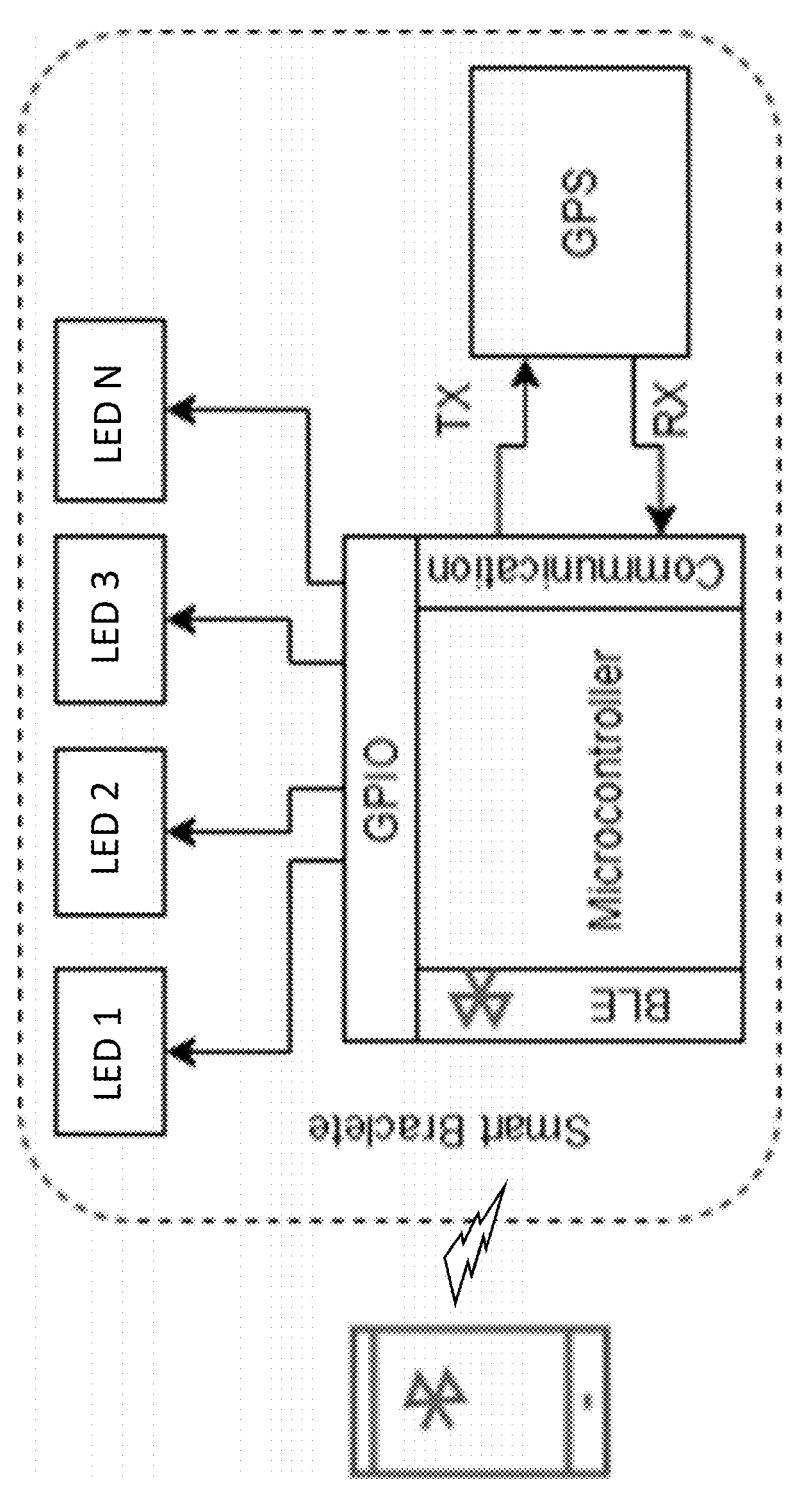
FIG. 7 is a diagram of the smart bracelet with LED lights, according to an embodiment.

FIG. 6 illustrates an embodiment of the smart bracelet that further comprises LED lights that are connected directly to the micro controller. Built-in BLE (Bluetooth Low Energy) connection in the bracelet allows the bracelet to get command signals from the app and light up the LEDs. Each LED in the bracelet is connected separately with the controller pins. Whenever the user sends a signal from the mobile app to the controller it activates or deactivates the specific pin to activate (or deactivate) the corresponding LED (see FIG. 7). Each LED is connected with GPIO and activated according to the command signal from BLE port.

Figure 8:
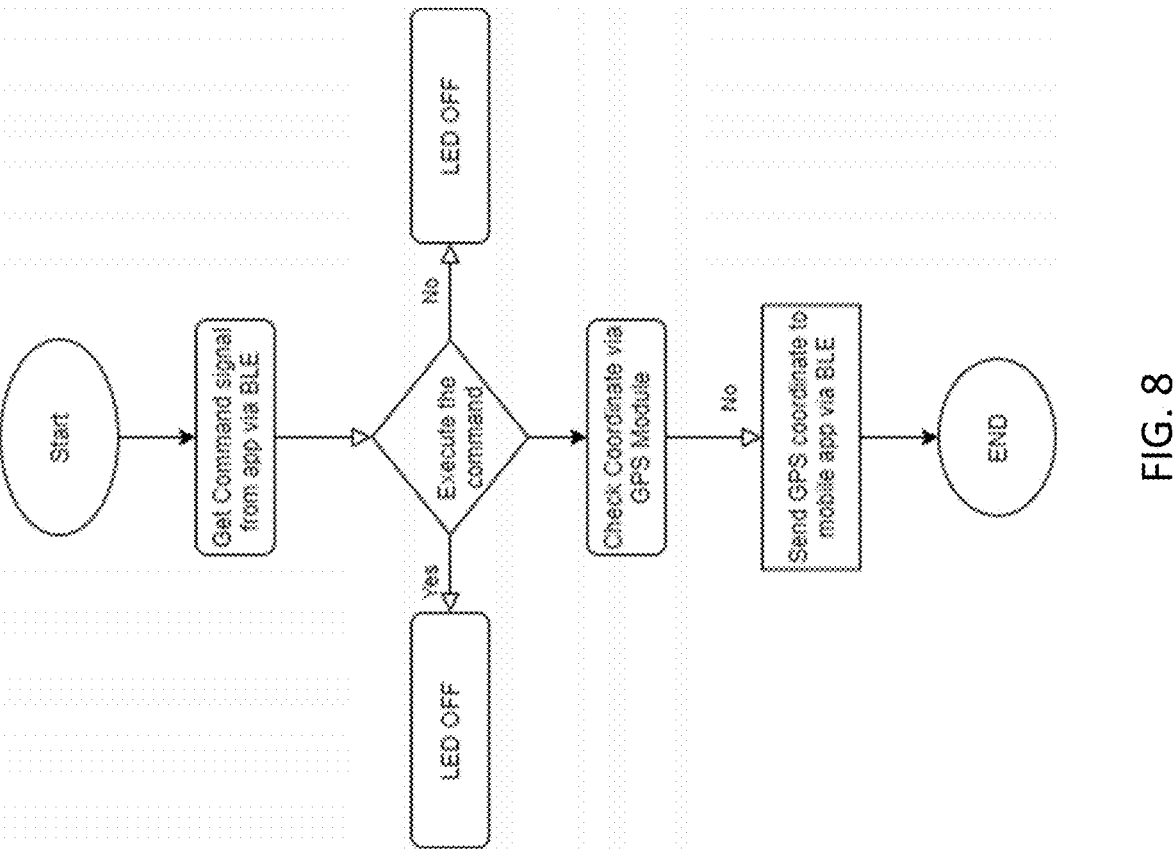
FIG. 8 shows an operational flow diagram of the integration with a mobile app, according to an embodiment.

As shown in FIG. 8, the user sends command signals from the mobile app via BLE. Then the microcontroller activates its specific pin to implement the command signal received from the user. The GPS module allows the microcontroller to get real time coordinates of the smart bracelet and then send back to the mobile app via BLE. In the initial stage the controller waits for the command signal from BLE port and control LED connected at the GPIO of the microcontroller. Meanwhile the controller also communicates with the GPS module and gets the real-time coordinates. It then sends these coordinates to the mobile app via BLE communication.

In other embodiments, the CODITTES, beads or charms, themselves are further comprised of one or more LEDs. The beads either in direct communication with the mobile app or indirectly in communication with the mobile app via a direct connection with the smart bracelet, can receive instructions to turn the LEDs on or off, or to set them to a particular color, brightness, or blinking sequence.

NFC Communication

Figure 9:
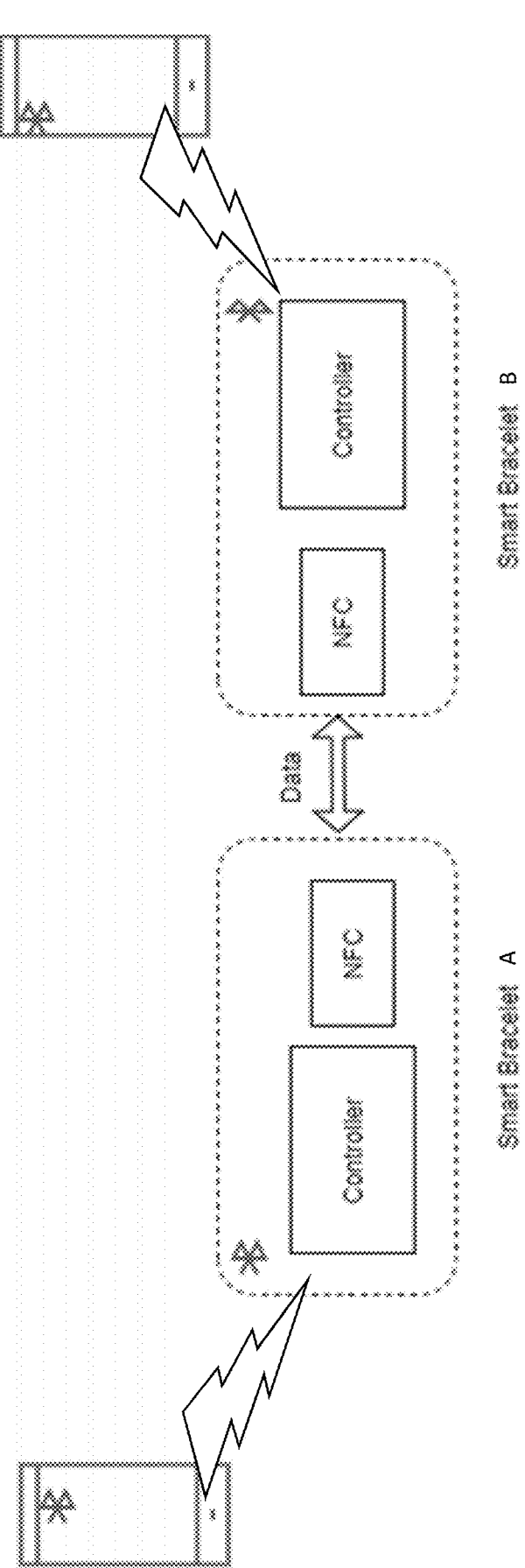
FIG. 9 shows a smart bracelet in communication with another smart bracelet, according to an embodiment.

In additional embodiments, the smart bracelet (already in communication with a corresponding mobile device) is further configured to communicate with another smart bracelet. This is accomplished, for example, using Near-Field Communications (NFC) protocols. (See FIG. 9.) The communication between mobile app and bracelet is done, for example, via BLE, where the mobile device acts as the source of information and provides required information to the smart bracelet. The mobile device processes the received information and turns the LED ON and OFF. The mobile app is also responsible in providing a unique ID to the smart bracelet. In this way we can configure the smart bracelets to communicate with each other and transfer information such as, but not limited to, contact details and Unique ID between the mobile apps. Smart bracelets communicate over an NFC channel and send an interrupt signal to the mobile app. The mobile app the sends the required data to the smart bracelet over BLE, the received data is then shared over NFC with another smart bracelet.

Figure 10:
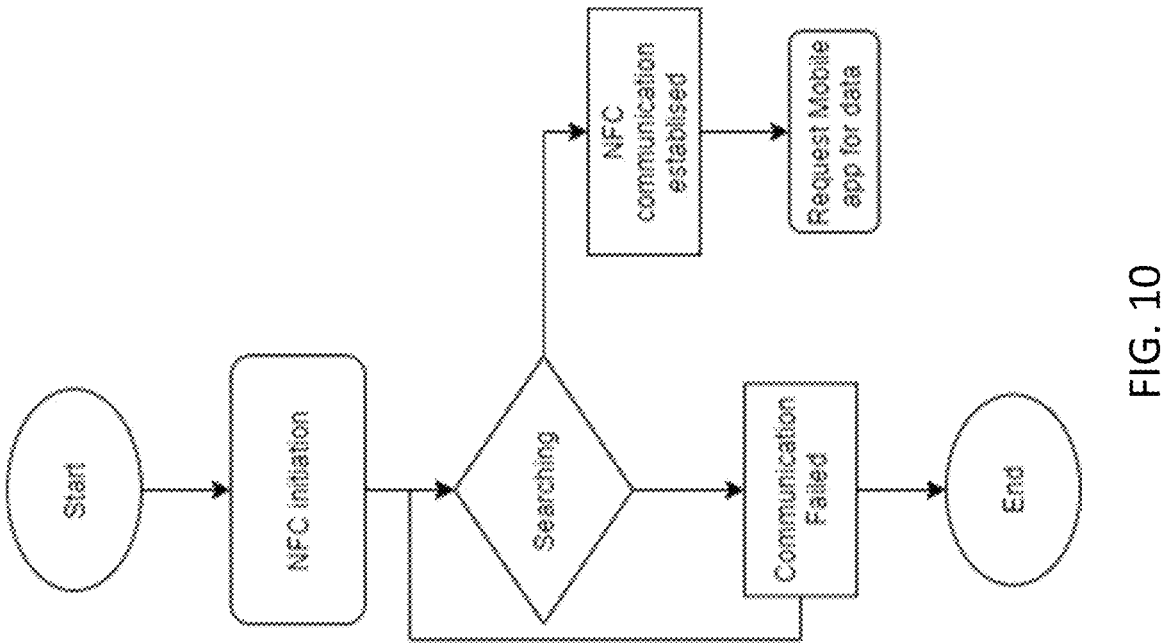
FIG. 10 is an operational flow diagram of the near field communication method implemented with a smart bracelet, according to an embodiment.
Figure 11:
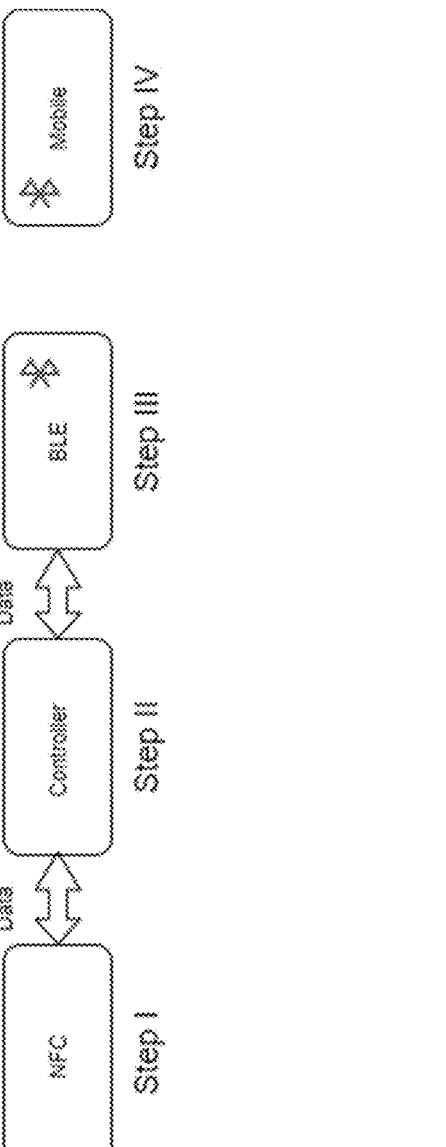
FIG. 11 illustrates the steps involved within the near field communication process.

NFC uses small range radio frequency signals to send and receive data, whenever smart bracelets come in contact with each other via the NFC module. It alerts the controller to generate a request for the mobile app to send the required data to the main controller over BLE. As the data from the mobile app is received, the controller transfers this data to the NFC module to transmit to the other bracelet. The received data on the other bracelet is transferred to the mobile app to save within mobile storage. (See FIG. 10.) The NFC connectivity enables the smart bracelet to communicate with another bracelet over a short distance. The Bluetooth channel fetches the required data from the mobile app and then transfers it to the other bracelet over NFC. Thus, NFC acts as the bridge between two bracelets and shares the specific bracelet identity to the mobile app. When the mobile app gets the user ID of the other smart bracelet it searches on the backend database and retrieves and saves that information in the mobile app. FIG. 11 illustrates the steps involved within NFC communication process.

Security

The smart bracelet and the system monitors the user's information via the backend database. The mobile app provides specific information about the user. Security of data is an important aspect of the invention since one of the objects of the invention is to hold the information of user and then transfer this information in an effective and secure manner. Dual communication between the bracelet and mobile app over the Bluetooth channel enables the system to highlight the general characteristics of the user and transfer required data to other devices whenever more than one smart bracelet comes in direct contact with each other. A safe and secure communication network can be implemented if a unique ID is assigned to each smart bracelet. Assigning Unique ID to the smart bracelet secures the credential information.

The smart bracelet can be made to have unique ID and credential, to implement a safe and secure communication channel. Taking the advantage of communication between the mobile app and the bracelet, assigning a unique ID to the smart bracelet is accomplished as follows: Whenever a user signs-in using the mobile app and shares their email ID, the mobile app assigns a unique ID (similar to a MAC address), to the smart bracelet via Bluetooth communication. Based on that Unique ID, the smart bracelet is registered in the backend database with that Unique ID and accesses all other information associated with that unique ID.

Data transfer between the mobile app and the smart bracelet is encrypted with a combination of logic gates. Received Data at the NFC port is encrypted and sent to the mobile app via BLE. The counter algorithm at the back end decodes the encryption and displays this information to the user. The decryption and encryption of data make it possible to secure the information for authorized persons only. The mobile app and the smart bracelet share encrypted data via BLE. The NFC channels enable the smart bracelet to detect other smart bracelets and share information with other devices. In this way the communication of the smart bracelet takes place in a secure way and only the authorized person can view the shared information in their mobile app.

Figure 12:
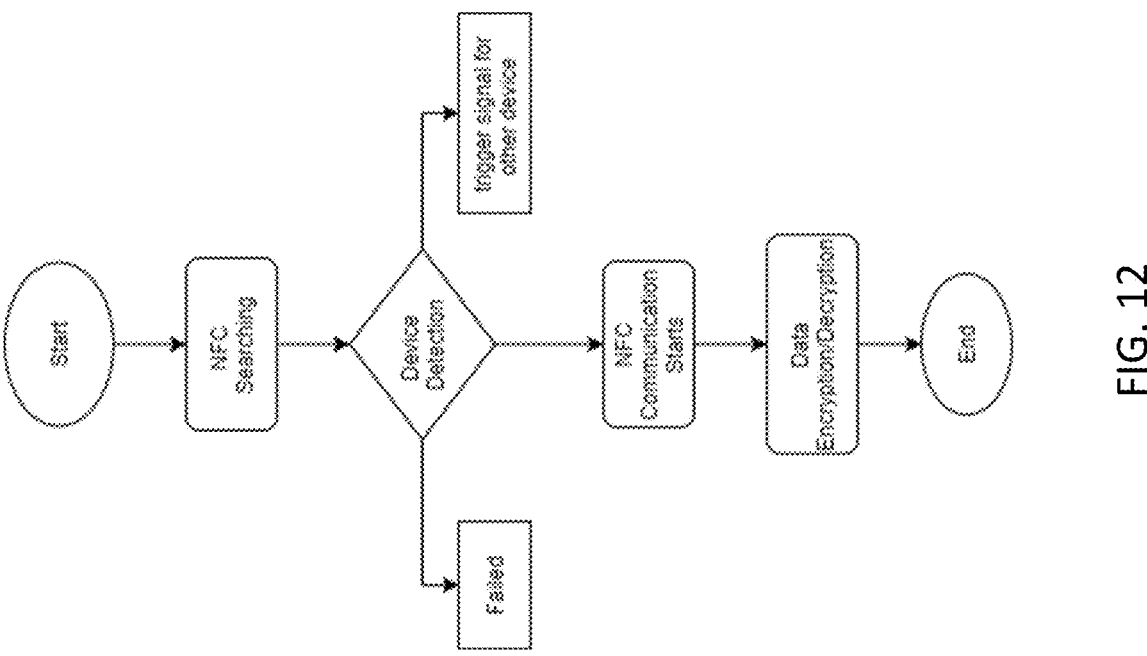
FIG. 12 is an operational flow diagram of the encryption and decryption processes, according to an embodiment.

FIG. 12 shows the process of encryption and decryption as one of the smart bracelets detects the other smart bracelet over NFC. Both devices send a trigger signal to their paired mobile device to fetch the data from the mobile app. The controller encrypts the received data and passes to the NFC channel. Encrypted data on other end is then decrypted by the controller and allowed to pass to the mobile app for further communication. Logical gates are used to encrypt or decrypt the data.

Biometric Data and Body Sensing

In embodiments, the smart bracelet is further configure to monitor body conditions such as, but not limited to, heartbeat, blood pressure and temperature. The system, through the mobile app, can then display and share personal data to authorized persons.

The smart bracelet, further comprising one or more sensors, allows the user to monitor body conditions. Based on various body sensors we can monitor multiple parameters of the body and alert the user for adverse conditions or illness based on pre-configured parameters. For example, the system can monitor the heartbeat and displays the information gathered by the sensor(s) with three different levels such as high, medium, and low. A heartbeat sensor is used to sense the pulses from the vein and send these signals to the controller. The input signal from the sensor is processed in the controller and compared with the predefined rules to do the final decision.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the claims. Modifications and changes to the invention should be readily apparent to those having ordinary skill in the art, which modifications are intended to be within the spirit and scope of the invention as claimed. It is also understood that the foregoing description is illustrative of the present invention and should not be considered as limiting. Components from one embodiment can be combined with another embodiment and remain within the spirit and scope of the invention. Therefore, other embodiments of the present invention are possible without departing from the spirit and scope of the present invention.

The invention claimed is:

1. A geo-social mobile communication platform comprising:

a smart bracelet configured with encryption and decryption processes, and a process for near field communication between smart bracelets; and a mobile device programmed with a front-end application and communicative with a back-end application and/or database, the smart bracelet providing the ability to combine self-expression of social cues with social networking technology.

2. The geo-social mobile communication platform of claim 1, wherein the smart bracelet is configured with near field communication technology.

3. The geo-social mobile communication platform of claim 1, wherein the front-end application and the back-end application are integrated to share data via a wireless network connection.

4. The geo-social mobile communication platform of claim 1, further comprising a mobile application for integrating with the smart bracelet.

* * * * *